(12) United States Patent
Roberts et al.

(10) Patent No.: US 12,109,498 B2
(45) Date of Patent: Oct. 8, 2024

(54) SYSTEMS AND METHODS FOR TRANSMITTING INTERACTIVE GAME FEATURES TO MULTIPLE DEVICES OF A SHARED STREAMING MEDIA SESSION

(71) Applicant: Discovery.com, LLC, New York, NY (US)

(72) Inventors: Brian F. Roberts, Dallas, TX (US); Chad Peltola, Fairfield, CT (US); Charles Robertson, Seattle, WA (US)

(73) Assignee: Discovery.com, LLC, New York, NY (US)

( * ) Notice: Subject to any disclaimer, the term of this patent is extended or adjusted under 35 U.S.C. 154(b) by 0 days.

(21) Appl. No.: 18/186,666

(22) Filed: Mar. 20, 2023

(65) Prior Publication Data

US 2023/0321549 A1     Oct. 12, 2023

Related U.S. Application Data

(63) Continuation of application No. 17/931,962, filed on Sep. 14, 2022, now Pat. No. 11,607,617, which is a
(Continued)

(51) Int. Cl.
*A63F 13/86*     (2014.01)
*A63F 13/285*    (2014.01)
(Continued)

(52) U.S. Cl.
CPC .......... *A63F 13/814* (2014.09); *A63F 13/285* (2014.09); *A63F 13/335* (2014.09);
(Continued)

(58) Field of Classification Search
CPC ........ A63F 13/215; A63F 13/23; A63F 13/30; A63F 13/33; A63F 13/332; A63F 13/335;
(Continued)

(56) References Cited

U.S. PATENT DOCUMENTS

| 10,105,608 B1 | 10/2018 | George et al. |
| 2002/0042920 A1 | 4/2002 | Thomas et al. |

(Continued)

FOREIGN PATENT DOCUMENTS

WO     2020068220 A1     4/2020

*Primary Examiner* — Omkar A Deodhar
(74) *Attorney, Agent, or Firm* — Bookoff McAndrews, PLLC

(57) ABSTRACT

Systems and methods for implementing one or more game features across devices associated with a synchronous multimedia stream are disclosed. One method may include: establishing, on the server, a virtual media streaming session; connecting two or more user profiles of a media streaming platform to the virtual media streaming session; providing, in the virtual media streaming session, an article of multimedia content, wherein the article of multimedia content is simultaneously viewable on user devices associated with each of the two or more user profiles; determining, using a processor associated with the server, whether one or more interactive game features associated with the article of multimedia content are activated; and implementing, responsive to determining that the one or more interactive game features are activated, aspects associated with the one or more interactive game features in the virtual media streaming session.

20 Claims, 11 Drawing Sheets

Related U.S. Application Data continuation of application No. 17/658,137, filed on Apr. 6, 2022, now Pat. No. 11,471,777.

(51) Int. Cl.
 *A63F 13/335* (2014.01)
 *A63F 13/798* (2014.01)
 *A63F 13/814* (2014.01)

(52) U.S. Cl.
 CPC ............ *A63F 13/798* (2014.09); *A63F 13/86* (2014.09); *A63F 2300/51* (2013.01)

(58) Field of Classification Search
 CPC ........ A63F 13/40; A63F 13/426; A63F 13/45; A63F 13/52; A63F 13/533; A63F 13/537; A63F 13/5372; A63F 13/5375; A63F 13/55; A63F 13/56; A63F 13/57; A63F 13/58; A63F 13/60; A63F 13/69; A63F 13/79; A63F 13/843; A63F 13/547; A63F 13/87; A63F 2300/407; A63F 2300/537; A63F 2300/5553; A63F 2300/577; A63F 2300/609; A63F 2300/6623; A63F 2300/69

See application file for complete search history.

(56) References Cited

U.S. PATENT DOCUMENTS

| | | |
|---|---|---|
| 2014/0214920 A1 | 7/2014 | Wong et al. |
| 2017/0003740 A1 | 1/2017 | Verfaillie et al. |
| 2018/0295175 A1 | 10/2018 | Smith et al. |
| 2019/0111343 A1 | 4/2019 | Payzer et al. |
| 2019/0262724 A1 | 8/2019 | Trombetta et al. |
| 2020/0066088 A1 | 2/2020 | Nelson |
| 2020/0074181 A1 | 3/2020 | Chang et al. |
| 2021/0089780 A1 | 3/2021 | Chang et al. |
| 2021/0248702 A1 | 8/2021 | Imperio et al. |
| 2021/0394073 A1 | 12/2021 | Osman et al. |
| 2022/0171960 A1 | 6/2022 | Nelson et al. |

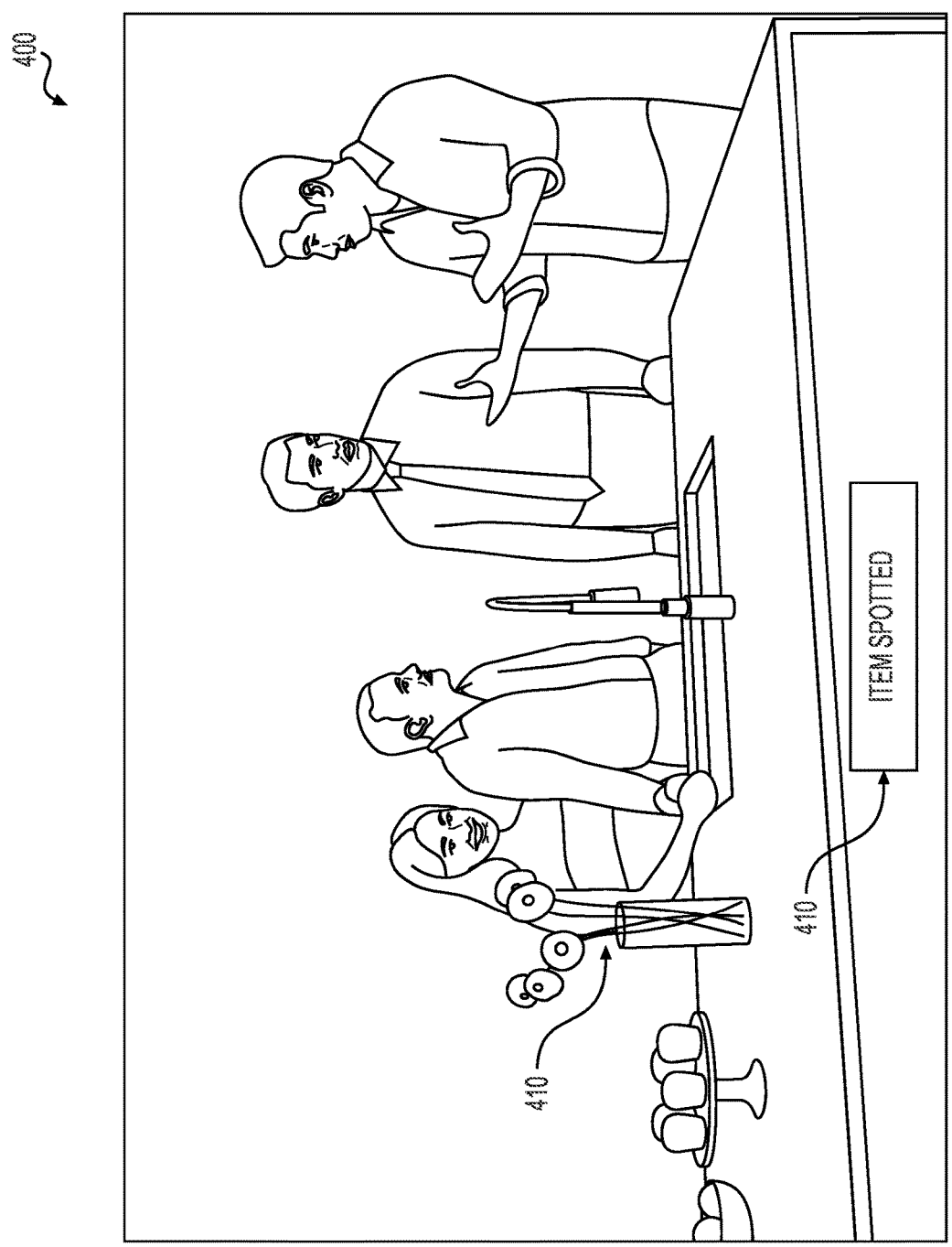

SYSTEMS AND METHODS FOR TRANSMITTING INTERACTIVE GAME FEATURES TO MULTIPLE DEVICES OF A SHARED STREAMING MEDIA SESSION

CROSS REFERENCE TO RELATED APPLICATION(S)

This patent application is a continuation of and claims the benefit of priority to U.S. Nonprovisional patent application Ser. No. 17/931,962, filed on Sep. 14, 2022, which itself is a continuation of and claims the benefit of priority to U.S. Nonprovisional patent application Ser. No. 17/658,137, filed on Apr. 6, 2022, each of which are incorporated by reference herein in their entireties.

TECHNICAL FIELD

Various embodiments of the present disclosure relate generally to the field of multimedia content streaming and, more particularly, to enabling users of a media streaming application platform to interact with a synchronous multimedia stream.

BACKGROUND

With the rapid rise of at-home entertainment, many individuals may more easily access and interact with a vast array of multimedia content, such as television shows, films, documentaries, and the like, via, for example, subscription-based media streaming platforms. Individuals may have more control over the content they watch, how they watch it, and where they choose to watch it from. However, despite the many options and comforts that come with video streaming services, for some individuals, the content consumption experience may be isolating or limiting if they, for example, live alone or if their friends live far away. For others, the content consumption experience may be limited to a small group of people, such as, for example, the people they live with (e.g., roommates, family members).

One significant part of the multimedia consumption experience may be the ability to share one's viewing experience with other people. Enabling individuals to engage in a remote (e.g., virtual) shared viewing may allow individuals to open up and connect with one another as they take part in the same viewing experience. The present disclosure is accordingly directed to optimizing the shared viewing experience.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for enabling synchronous consumption of streaming media by a group of users.

In summary, one aspect provides a method for transmitting interactive game features to multiple devices associated with a synchronous multimedia stream using a server in network communication with at least one database, the method comprising operations including: establishing, on the server, a virtual media streaming session; connecting two or more user profiles of a media streaming platform to the virtual media streaming session; providing, in the virtual media streaming session, an article of multimedia content, wherein the article of multimedia content is simultaneously viewable on user devices associated with each of the two or more user profiles; determining, using a processor associated with the server, whether one or more interactive game features associated with the article of multimedia content are activated; and implementing, responsive to determining that the one or more interactive game features are activated, aspects associated with the one or more interactive game features in the virtual media streaming session.

Another aspect provides a system for transmitting interactive game features to multiple devices associated with a synchronous multimedia stream, the system comprising: at least one database; a server in network communication with the at least one database, the server configured to perform operations including: establishing, on the server, a virtual media streaming session; connecting two or more user profiles of a media streaming platform to the virtual media streaming session; providing, in the virtual media streaming session, an article of multimedia content, wherein the article of multimedia content is simultaneously viewable on user devices associated with each of the two or more user profiles; determining, using a processor associated with the server, whether one or more interactive game features associated with the article of multimedia content are activated; and implementing, responsive to determining that one or more interactive game features are activated, aspects associated with the one or more interactive game features in the virtual media streaming session.

A further aspect provides a non-transitory computer-readable medium storing computer-executable instructions which, when executed by a server in network communication with at least one database, cause the server to perform operations comprising: establishing, on the server, a virtual media streaming session; connecting two or more user profiles of a media streaming platform to the virtual media streaming session; providing, in the virtual media streaming session, an article of multimedia content, wherein the article of multimedia content is simultaneously viewable on user devices associated with each of the two or more user profiles; determining, using a processor associated with the server, whether one or more interactive game features associated with the article of multimedia content are activated; and implementing, responsive to determining that the one or more interactive game features are activated, aspects associated with the game feature in the virtual media streaming session.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 4A-4B depict an exemplary interactive graphical user interface (GUI) having implemented game features associated with an item spotting game, according to one or more embodiments.

DETAILED DESCRIPTION OF EMBODIMENTS

Figure 1:
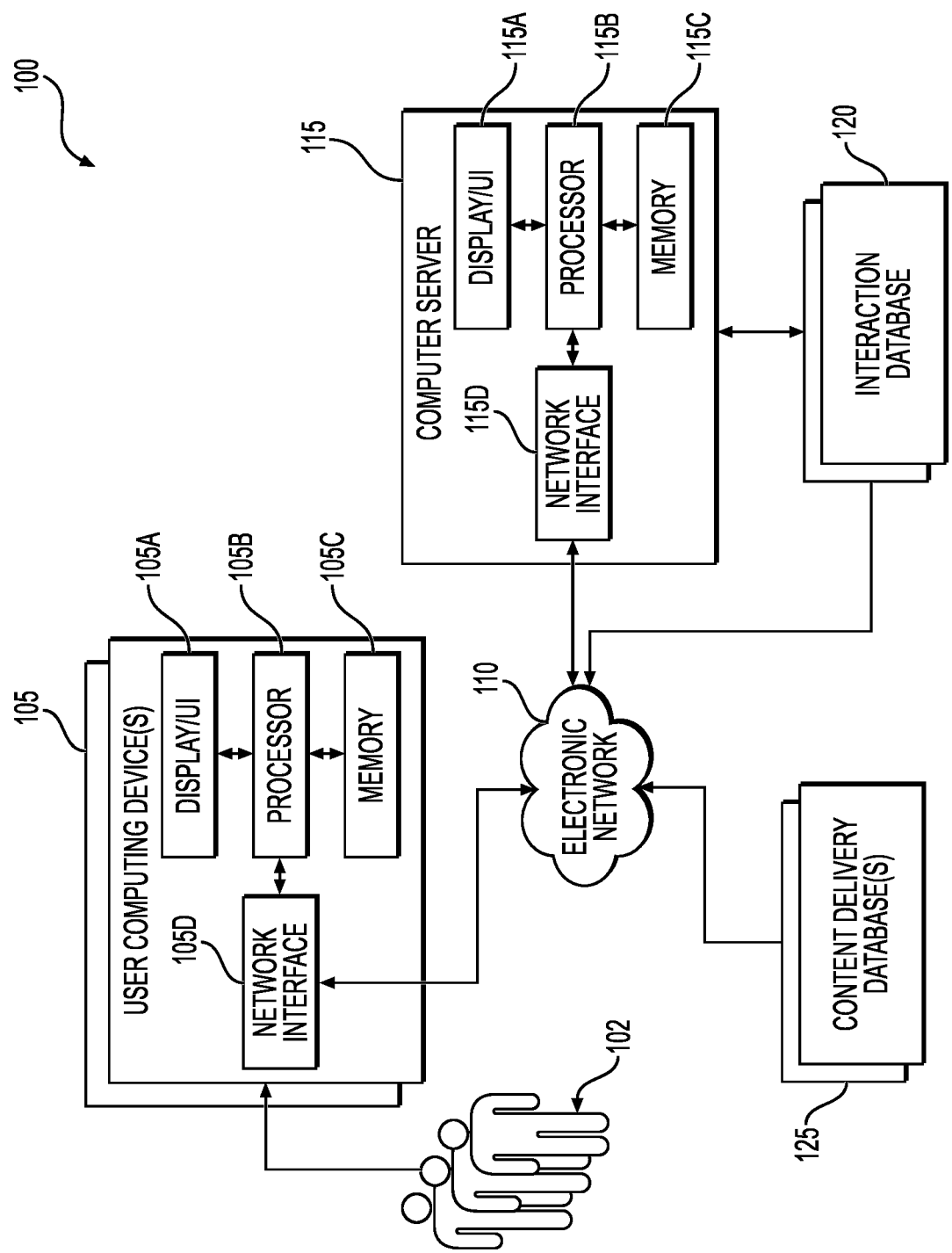
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

The term "user", "subscriber," and the like generally encompasses consumers who are subscribed to a streaming service (e.g., streaming platform) associated with the system described herein. The term "streaming service" (e.g., streaming platform) may refer to subscription-based video-on-demand (SVoD) services such as television shows, films, documentaries, and the like. The term "user" may be used interchangeably with "user profile," "profile," and the like throughout this application. The phrase "linking users" may be used interchangeably with "linking user profiles" and the like throughout this application. The phrase "registered with" may be used interchangeably with "subscribed to" and the like throughout this application. The phrase "multimedia content" or "media content" may be used interchangeably with "multimedia content item" and the like throughout this application.

In the following description, embodiments will be described with reference to the accompanying drawings. As will be discussed in more detail below, in various embodiments, systems and methods for synchronous group consumption of streaming media are described.

Application platforms exist that attempt to duplicate the real-life group-based viewing experience. More particularly, many popular media-streaming services provide users with an option to view multimedia content with one or more other individuals in a virtual setting (e.g., a virtual room). Participants involved in this shared experience may each view the same article of media content substantially simultaneously (i.e., using their own electronic devices). Such a feature may ultimately improve an individual's content consumption experience by providing a social component that they otherwise would not have by streaming media using conventional means.

Some individuals, however, may want a more immersive experience with their virtual group. Specifically, these individuals desire virtual room functionality that is able to more closely duplicate a real-life group viewing setting. Accordingly, a variety of application platforms exist today that provide individuals the option to provide input (e.g., comments, emotive reactions, etc.) that other participants involved in the shared viewing experience may see. Although such features improve the social nature of the virtual group, they still do not enable the virtual group participants to engage in various activities that they otherwise might in real life.

To address the above-noted problems, the present disclosure describes a system that can expand the nature of interactions that participants in a virtual "watch party" may have with one another. In addition to improving upon the way that virtual group participants provide input to the virtual group (e.g., by enabling voice-to-text input functionality, presenting comments/reactions in more intuitive ways, etc.), the system may also enable participants to activate certain game features that are based on content occurring within the synchronous article of multimedia content. Additionally, the system may further augment the shared viewing experience by leveraging sensors and/or components on each user's device to enact haptic effects that may mirror events occurring in the synchronous article of multimedia content.

In an exemplary use case, a server associated with the system may establish a virtual media streaming session. The virtual media streaming session may be a digital space in which groups of individuals may virtually gather (e.g., as part of a "watch party") to synchronously view multimedia content (e.g., video series, movies, documentaries, live event broadcasts, etc.). In the context of this application, "synchronous viewing" refers to a situation in which an article of multimedia content is viewed simultaneously by each member in the viewing party. Specifically, a chosen multimedia stream may be simultaneously presented on devices associated with each user profile connected to the virtual media streaming session. A first user profile (a "host") may facilitate creation of the virtual media streaming session by inviting one or more other individuals to partake in a shared multimedia viewing experience. Responsive to identifying the invitees, and user profiles associated therewith, the server may connect all relevant user profiles to the virtual media streaming session.

The participants to the shared multimedia stream may provide input (e.g., text-based comments, emoticons, like or dislike reaction, etc.) using their own devices that may then be presented to some or all of the other participants. In an embodiment, participants may view the synchronous multimedia article and provide input using a single device. Alternatively, in another embodiment, participants may utilize a combination of devices to optimize their shared viewing experience (e.g., a participant may view the article of multimedia content on a first device, such as their television, and utilize a second device, such as their smart phone, to provide input). In an embodiment, the input may be presented chronologically (i.e., in the order that it is received by the server) and/or may be co-displayed with the synchronous article of multimedia content (e.g., in an unobtrusive portion of the screen). In an embodiment, participants may provide a comment using various means. For example, participants can utilize a conventional input device such as a remote control, stylus, and/or digital keyboard to type the comment. Additionally or alternatively, participants can provide audible input to their device that can thereafter be processed by the server and be converted to text-based input. In an embodiment, participants may be enabled to select and send reactions by, for example, long pressing a "select" icon, scrolling through an available list of reactive emoticons, and then submitting the reaction by pressing the "select" icon again.

The virtual media streaming session may contain a "Games" option that, when activated, may enable participants to select a game that they can all play. More particularly, the system may transmit one or more interactive game features associated with a selected game type to the devices associated with the virtual media streaming session. Each game type may be designed to complement the synchronous multimedia article and features of the game may be based on aspects associated with the multimedia article. Non-limiting examples of possible game types include a task performance game, an item identification game, a quiz-based game, a poll-based game, and a sing-a-long game.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

FIG. 1 is a diagram depicting an exemplary block diagram of a system environment 100 for enabling synchronous group consumption of multimedia content between at least two users, according to one or more embodiments of the present disclosure. The system environment 100 may include two or more user computing devices 105 operated by users 102, an electronic network 110, a computer server 115, an interaction database 120, and one or more content delivery databases 125. One of skill in the art would recognize that the server 115 may configure the one or more user computing devices 105 so as to experience different functionalities and/or have access to different information (e.g., determined by credentials such as user ID/password).

The user computing devices 105, the server 115, the interaction database 120 and/or the content delivery databases 125 may be connected via the network 110, using one or more standard communication protocols. The server 115 may be configured to receive data over the network 110 from the user computing devices 105, including, but is not limited to, requests to invite others to a shared viewing experience in a virtual media streaming session (e.g., invite requests) and responses to the invite requests. "Interaction data" includes data received from the user computing devices 105 as well as data generated and analyzed by the computer server 115. Interaction data may be stored in the interaction database 120, and may include information as to which users/user profiles are present in a virtual media streaming session, the multimedia content (e.g., movies, shows, documentaries) presented in the virtual media streaming session, communications (e.g., reactions, comments, favorites) shared between users in the virtual media streaming session while watching the shared content, and notifications generated and transmitted by the computer server 115 to users. The server 115 may store the interaction data received over the network 110 in the interaction database 120.

In one or more embodiments, the computer server 115 and the interaction database 120 may be one server computer device and a single database, respectively. Alternatively, in one or more embodiments, the server 115 may be a server cluster, or any other collection or network of a plurality of computer servers. The interaction database 120 also may be a collection of a plurality of interconnected databases. The server 115 and the interaction database 120 may be components of one server system. Additionally, or alternatively, the server 115 and the interaction database 120 may be components of different server systems, with the network 110 serving as the communication channel between them. The computer server 115, the interaction database 120, and/or the content delivery databases 125 may be associated with an entity 130, such as a subscription-based streaming service provider (not shown). In some embodiments, the computer server 115, the interaction database 120, and/or the content delivery databases 125 may collectively be referred to as an entity system.

As shown in FIG. 1, the computer server 115 may be in communication with the user devices 105 to transmit and receive messages from each other across the network 110. The user devices 105 may be associated with users who are subscribed to a streaming service platform provided by the computer server 115. The network 110 may comprise one or more networks that connect devices and/or components of environment 100 to allow communication between the devices and/or components. For example, the network 110 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of environment 100. In some embodiments, the network 110 may be implemented using cell and/or pager networks, satellite, licensed radio, or a combination of licensed and unlicensed radio. The network 110 may be associated with a cloud platform that stores data and information related to methods disclosed herein.

The user computing device 105 may include a display/user interface (UI) 105A, a processor 105B, a memory 105C, and/or a network interface 105D. The user computing device 105 may be a personal computer (PC), a tablet PC, a set-top box (STB), a streaming device (e.g., Apple TV®, Amazon Fire®, Roku® player, Google Chromecast®), a television (TV), a smart TV, a gaming console, a personal digital assistant (PDA), a mobile device, a palmtop computer, a laptop computer, a desktop computer, etc. The user computing device 105 may execute, by the processor 105B, an operating system (O/S) and at least one application (each stored in memory 105C). The application may be a browser program or a mobile application program (which may also be a browser program in a mobile O/S). The application may generate one or more interactive graphic user interfaces (GUIs), such as, for example, the exemplary GUIs shown in FIGS. 3-8, based on instructions/information received from the server 115. In some embodiments, the application may generate one or more interactive GUIs based on instructions/information stored in the memory 105C. The interactive GUIs may be application GUIs for the application executed based on XML and Android programming languages or Objective-C/Swift, but one skilled in the art would recognize that this may be accomplished by other methods, such as webpages executed based on HTML, CSS, and/or scripts, such as JavaScript. The display/UI 105A may be a touch screen or a display with other input systems (e.g., mouse, keyboard, etc.). The network interface 105D may be a TCP/IP network interface for, e.g., Ethernet or wireless communications with the network 110. The processor 105B, while executing the application, may receive user inputs from the display/UI 105A, and perform actions or functions in accordance with the application.

The computer server 115 may include a display/UI 115A, a processor 1156, a memory 115C, and/or a network interface 115D. The server 115 may be a computer, system of computers (e.g., rack server(s)), and/or or a cloud service computer system. The server 115 may execute, by the processor 1156, an operating system (O/S) and at least one instance of a server program (each stored in memory 115C). The server 115 may store or have access to information from interaction database 120 and content delivery databases 125. The display/UI 115A may be a touch screen or a display with other input systems (e.g., mouse, keyboard, etc.) for an operator of the server 115 to control the functions of the server 115 (e.g., update the server program and/or the server information). The network interface 115D may be a TCP/IP network interface for, e.g., Ethernet or wireless communications with the network 110. The server program, executed by the processor 1156 on the server 115, may be configured to identify interaction partners that align with a user's mission(s) of interest, as will be described in further detail below.

As described above, the interaction database 120 may store data associated with users subscribed to a streaming service platform associated with the computer server 115. In addition to the interaction data, the interaction database 120 may also store additional data received from user computing devices 105, including real time and/or near real time location data (e.g., GPS data) of the user computing devices 105. The interaction database 120 may also store recommendations generated by the computer server 115, such as recommendations for a user to watch a certain show, movie, and/or other multimedia content based on the past viewing activity (e.g., viewing history) of other user(s) to which the user is linked to (e.g., that a user is friends with on the streaming platform).

The interaction database 120 may also store user profiles generated by the computer server 115 for the users 102. In some embodiments, the information described above, including the interaction data and any additional data received from user computing devices 105, may be stored in a plurality of user profiles within the interaction database 120. Each user profile may correspond to each user 102 in communication with the server 115. A user 102 may have multiple user computing devices 105 registered with the server 115 based on the user's 102 viewing habits and/or preferences. For example, one user may register a personal laptop, a smart TV, and a mobile device with the server 115. Information associated with registered user computing device(s) 105 and the user's 102 viewing habits and/or viewing preferences may all be stored within the user's user profile.

In some embodiments, in addition to the interaction data, each user profile may also include information associated with a respective user and their user computing device(s) 105 (e.g., a device identifier, device type), the user's name, a username or a nickname provided by the user for the user profile, content viewing preferences provided by the user, recommendations provided to the user by the server 115, the user's past viewing activity, IP addresses and locations (as well as accompanying dates and times) from where the user has logged in from, and/or user analytics generated by the server 115. In these embodiments, the user profiles may be updated to reflect a corresponding user's recent activities with another user, including sending or accepting an invite request.

In the system environment 100, the computer server 115 may retrieve multimedia content requested by users from the content delivery databases 125 to enable requested content to be streamed by users on the user computing devices 105. The content delivery databases 125 may store volumes of multimedia content items, including, for example, video series, movies, documentaries, and additional programming content that may be streamed by users 102 on the user computing devices 105. In some embodiments, the content delivery databases 125 may be maintained by third party content providers. In other embodiments, the content delivery databases 125 may be maintained by the server 115 and/or additional servers associated with the server 115.

Figure 2:
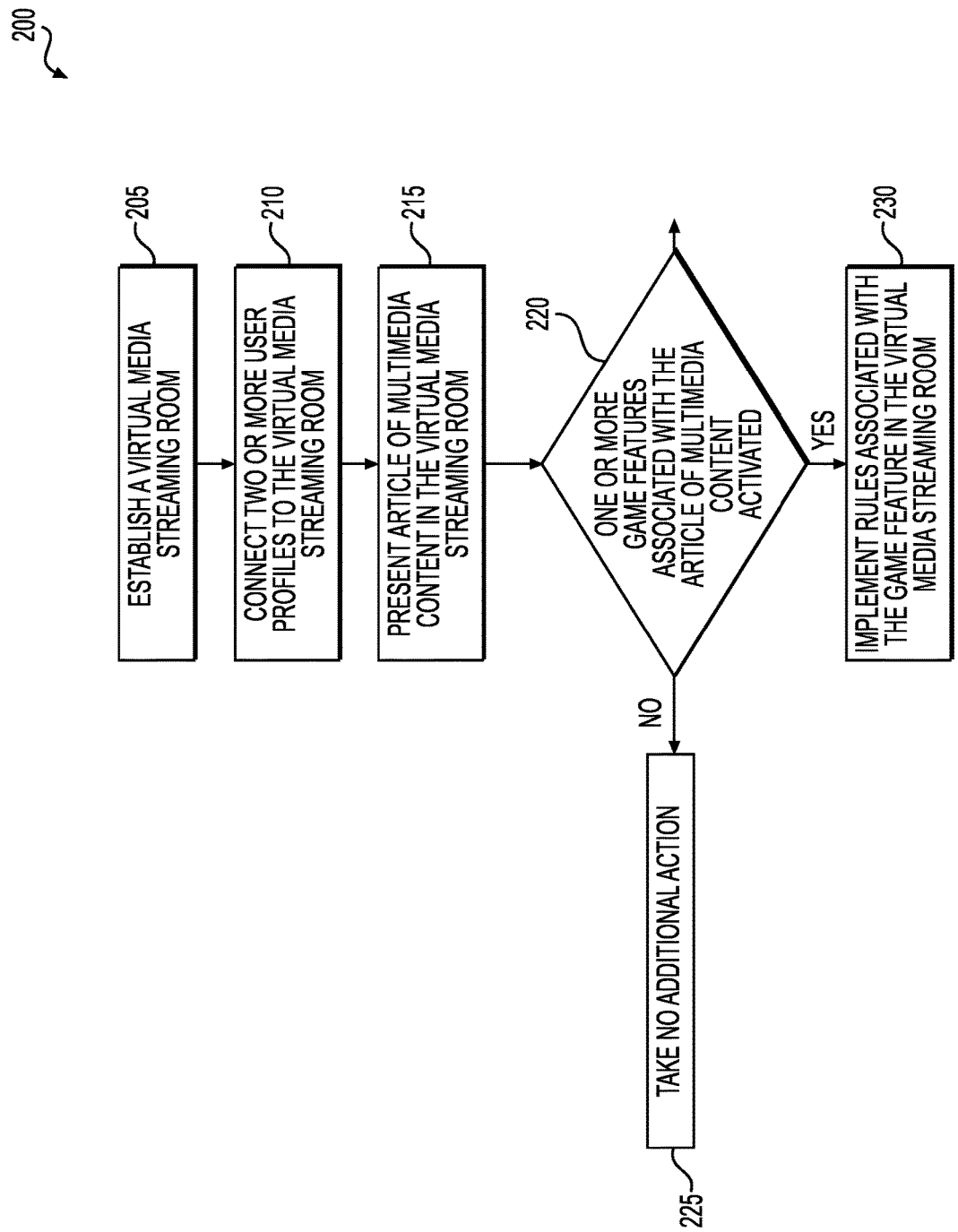
FIG. 2 depicts an exemplary flowchart of a method of transmitting interactive game features to devices associated with a synchronous multimedia stream, according to one or more embodiments.

FIG. 2 depicts an exemplary flowchart 200 for implementing one or more game features in a virtual media streaming session. The exemplary process flow 200 may be implemented by system environment 100, which includes user computing devices 105 associated with users 102, computer server 115, interaction database 120, and content delivery databases 125 (all shown in FIG. 1).

At step 205, an embodiment may establish a virtual media streaming session. Establishment of the virtual media streaming session may be originally facilitated in response to the transmission of an invite request (e.g., an invitation) from a first user (e.g., "user A") to a second user (e.g., "user B"). User B may be a designated "friend" or "contact" of user A on the streaming service platform whose profile may be easily accessible to user A via navigation through a "friends list". This invite request may be an invitation from user A to user B to join a virtual media streaming session, and more specifically, to be connected in a shared multimedia viewing experience via computer server 115. The invite request may be transmitted from user A's user computing device 105, and may identify a user (e.g., "user B") with whom user A wishes to invite to the virtual media streaming session. It is important to note that a first user can invite more than one other individual to the virtual media streaming session. The invitation of a single individual to the virtual media streaming session, as described here, is not intended to be limiting and is described as such purely for exemplary purposes.

At step 210, upon detecting acceptance of the invite request, an embodiment may connect, using computer server 115, the user profiles associated with user A and user B to the virtual media streaming session. Once connected, the computer server 115 may present, at step 215, an article of multimedia content ("multimedia article") in the virtual media streaming session. The multimedia article may be selected by one or more of the participants present in the virtual media streaming session and may be retrieved from content delivery database(s) 125. This multimedia article may be synchronously viewed by each of the connected user profiles in a shared viewing experience, wherein each user watches the multimedia article on their own computer device 105. Additionally, computer server 115 may enable input (e.g., comments, reactions, etc.) provided by any participant in the virtual media streaming session to be viewable by other participants.

At step 220, an embodiment may determine whether one or more game features associated with the multimedia article are activated. In this regard, an embodiment may determine whether the participants have selected to play one or more different game types while watching the multimedia article. Non-limiting examples of potential game types include a task performance game, an item spotting game, a quiz-based game, a poll-based game, a sing-a-long game, and the like. In an embodiment, activation of the game features may be facilitated by a single individual (e.g., the host of the virtual media streaming session) or, alternatively, may be facilitated by a group of individuals (e.g., a majority vote in a group poll).

Responsive to determining, at step 220, that no game features are activated, an embodiment may, at step 225, take no additional action. More particularly, an embodiment may proceed to play the multimedia article in the virtual media streaming session without implementing any game features. Conversely, responsive to determining, at step 220, that one or more game features were activated, an embodiment may, at step 330, implement rules associated with the activated game features in the shared streaming experience. More particularly, the system may enable one or more game features associated with the selected game to be active on each user device connected to the virtual media streaming session.

FIGS. 3-8 depict exemplary interactive graphical user interfaces (GUIs) 300-800 for enhancing the shared experience for participants (e.g., users 102, shown in FIG. 1) in a virtual media streaming session according to one or more embodiments of the present disclosure. Exemplary GUIs 300-800 may be generated by the computer server 115 for display at each of the participant's user computing devices 105 (shown in FIG. 1), such as their TV or personal laptop.

In an embodiment, the participants may choose to play a task performance game in which, upon being presented with a notification in the virtual media streaming session, they need to each perform a predetermined task. For example, a task performance notification may intermittently appear in the virtual media streaming session prompting each user to take a sip of their drink (e.g., an alcoholic beverage). In an embodiment, the task performance notification may be configured to appear at a predetermined time interval (e.g., every minute, every 5 minutes, etc.) or may be configured to appear in response to events occurring in the multimedia article. More particularly, with respect to the latter, the computer server 115 may be able to glean data associated with objects presented and/or events occurring in the multimedia article (e.g., by accessing metadata associated with the article of multimedia content, by leveraging one or more audio and/or video processing techniques known in the art, etc.) and then utilize this data as a basis for providing the task performance notification. For example, a task performance notification may be configured to appear each time: a particular character is present in the scene, a specific word is uttered by any of the characters, a particular character performs a specific action, a specific object appears in the scene, and the like.

With continued reference to the task performance game, in an embodiment, the participants may either explicitly select the aspect(s) of the multimedia article that the task performance notification will be based on or may let the computer server 115 randomly choose. In an embodiment, the decision on which aspect(s) of the multimedia article to base the task performance notification on may be reliant upon a desired frequency of notification appearance (e.g., as designated by the participants). For example, in a situation where the participants want the task performance notification to occur at a low frequency, the computer server 115 may choose to base the notification on an infrequently occurring event (e.g., on the appearance of a secondary or tertiary character, on the utterance of an uncommon word or phrase, etc.). Conversely, in a situation where the participants want the task performance notification to occur at a higher frequency, the computer server 115 may choose to base the notification on a frequently occurring event (e.g., the appearance of a main character, the appearance of a primary object, the utterance of a popular word, etc.).

Figure 3:
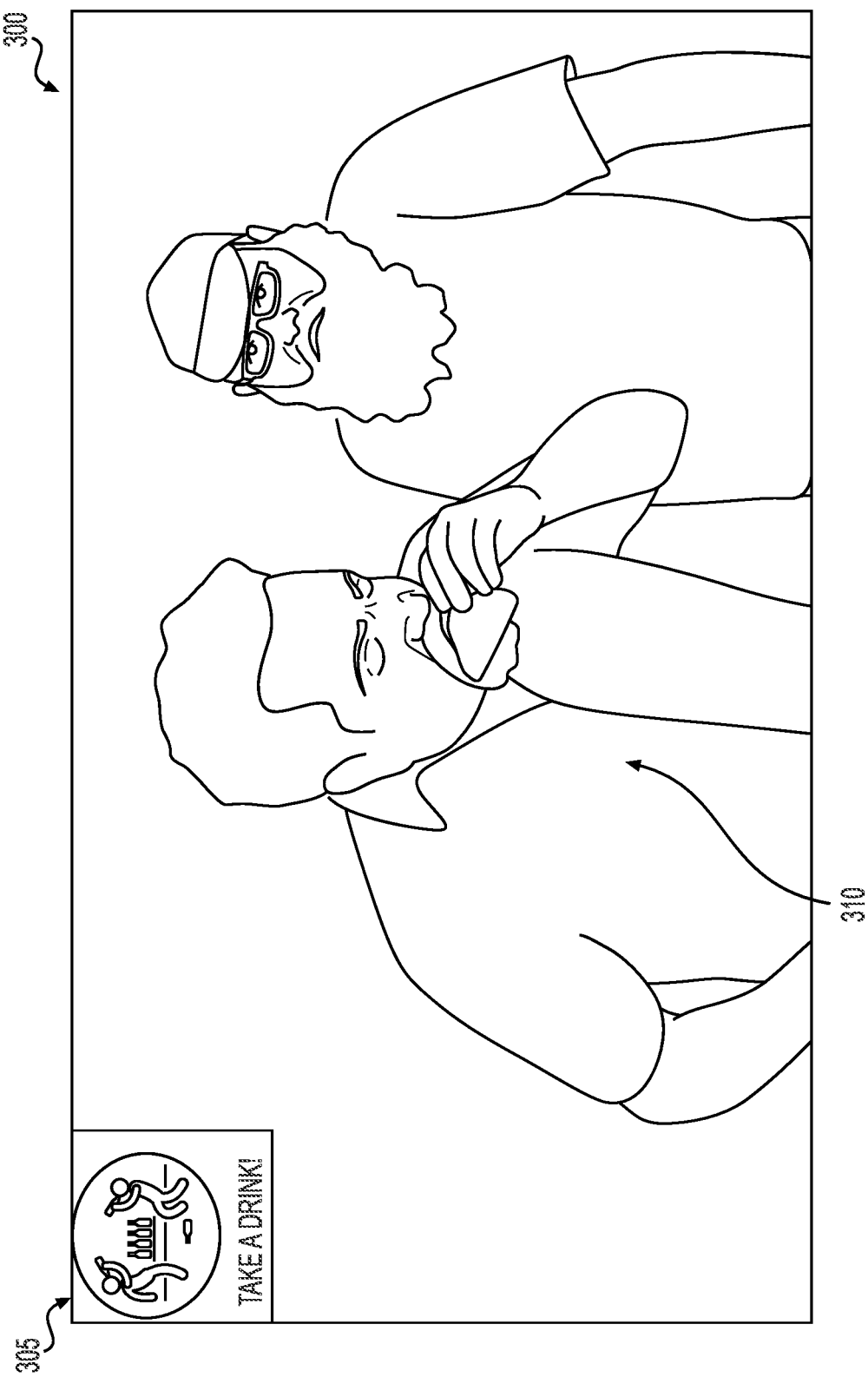
FIG. 3 depicts an exemplary interactive graphical user interface (GUI) having implemented game features associated with a task performance game, according to one or more embodiments.

Turning now to FIG. 3, an exemplary GUI 300 depicts a non-limiting example implementation of the task performance game. As shown in exemplary GUI 300, a food travel show has been selected as the multimedia article that the participants in the virtual media streaming session have chosen to synchronously watch. In this iteration of the task performance game, a notification 305 is configured to appear each time the computer server 115 detects that a show host 310 takes a bite of food. In this instance, the notification 305 may instruct each participant to take a drink of their beverage.

In an embodiment, the participants may choose to play an item recognition game in which they are tasked with identifying when a specific item appears in the multimedia article. More particularly, one or more notifications may appear during a duration of the multimedia article that inform the participants that a designated item will appear within a predetermined time frame (e.g., the next 30 seconds, the next minute, etc.) and request that they identify the designated item as soon as they see it (e.g., by selecting an "item spotted" icon presented on the screen, by circling the designated item using their finger or other input device, etc.). In an embodiment, the computer server 115 may be able to glean data associated with items presented in the multimedia article using previously described techniques (e.g., by utilizing one or more audio and/or video analysis techniques, etc.) and may dynamically choose which of these identified items should be the subject of each "round" of item recognition.

With continued reference to the item recognition game, in an embodiment, the item recognition game may contain a scoring component in which participants are awarded points for spotting the designated items. All awarded points may then be aggregated at the conclusion of the multimedia article and a winner (i.e., the participant with the most awarded points) may be announced. In some embodiments, the scoring may be dependent upon how quickly a participant spots the designated item (e.g., a participant that identifies the designated item first may be awarded more points than a participant that identifies the designated item more slowly). Additionally, participants that misidentify the designated object (e.g., by circling the wrong object) or attempt to identify the object too early (e.g., by selecting an "item spotted" icon before the designated object appears) may be awarded 0 points for that round.

Figure 4A:
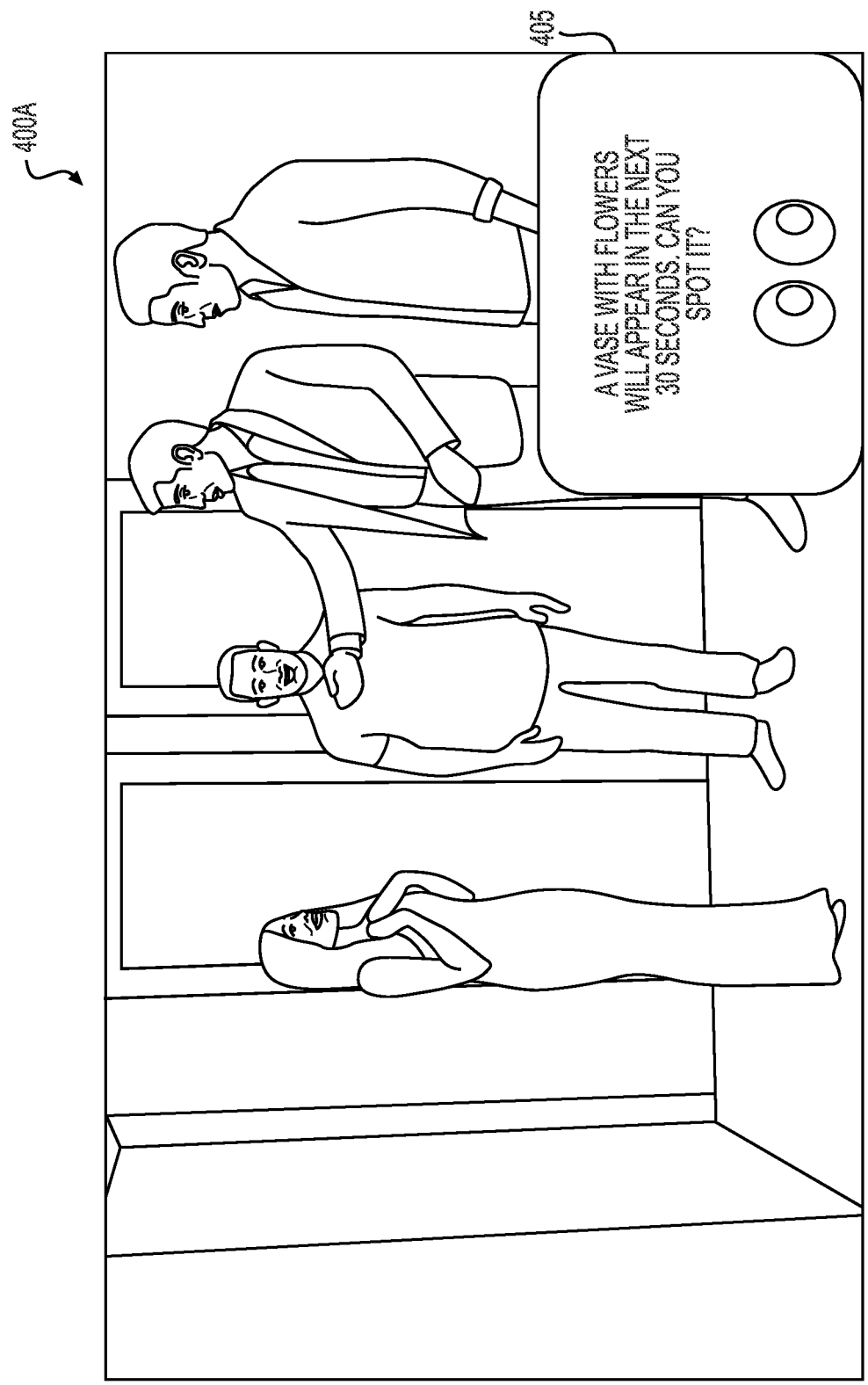

Turning now to FIGS. 4A-4B, an exemplary GUI 400 depicts a non-limiting example implementation of the item recognition game. As shown in the exemplary GUI 400 of FIG. 4A, a home renovation show has been selected as the multimedia article that the participants in the virtual media streaming session have chosen to synchronously watch. During the duration of the show, a notification 405 appears that instructs each participant to keep a look out for a vase with flowers. Additionally, the notification 405 may specify that this object will appear in a specific upcoming time frame (i.e., in the next 30 seconds). Turning now to FIG. 4B, exemplary GUI 400 now depicts a later point in the show (i.e., when the vase with flowers 410 is visible). In this iteration of the item recognition game, subsequent to provision of the notification 405 in FIG. 4A, an "item spotted" icon 415 may appear on each participant's screen. When a participant sees the designated object (i.e., the vase with flowers 410), they can select the "item spotted" icon 415 to provide an indication to the computer server 115 that they have spotted the object.

In an embodiment, the participants may choose to play a quiz-based game in which a plurality of quizzes may be periodically issued to the participants during the duration of the multimedia article. Each quiz may contain a question associated with content that occurred in the multimedia article. The question may be manually created (e.g., by a user, by a programmer of the media-streaming platform, etc.) or, alternatively, may be dynamically generated by the computer server 115 (e.g., based upon information gleaned from the multimedia article utilizing one or more video analysis techniques). In response to the quiz question, the participants may select a pre-configured answer from a popup list (e.g., a multiple-choice question list, etc.). In an embodiment, the participants may adjust the frequency at which the quiz questions appear. For example, the participants may desire for quiz questions to occur at predetermined intervals (e.g., every 5 minutes, etc.) or, alternatively, for the quiz questions to occur after each scene. In an embodiment, the multimedia article may be automatically paused during provision of the quiz question or, alternatively, may be configured to continue playing while participants answer the quiz question. In an embodiment, each quiz question may be required to be answered within a predetermined time period (e.g., within 10 seconds). For example, a countdown timer may be provided in a corner of the screen that indicates how long each participant has left to provide an answer to the quiz. In an embodiment, once all participants have selected an answer to the quiz question or once the predetermined time period to answer the quiz question has expired, whichever of the two happens first, the results of the quiz may be presented to each participant.

With continued reference to the quiz-based game, in an embodiment, the participants may specify the difficulty level of the quiz questions (e.g., easy, medium, hard, a mix of all of the foregoing, etc.). The computer server 115 may rely on this difficulty designation in situations where it dynamically constructs the quiz questions. For instance, lower difficulty questions may involve actions taken or phrases spoken by primary characters, the locations of the primary characters, characteristics of readily apparent/popular objects, and the like. Conversely, higher difficulty questions may involve actions or phrases spoken by secondary or tertiary characters, characteristics of objects in the background, obscure names of people or places, and the like. In an embodiment, a scoring component may be associated with the quiz-based game in which participants are awarded points for each correct quiz answer. In an embodiment, the awarded points may be weighted based on difficulty (e.g., 1 point for getting an easy question correct, 2 points for getting a hard question correct, etc.). All awarded points may then be aggregated at the conclusion of the multimedia article and a winner (i.e., the participant with the most awarded points) may be announced.

Figure 5:
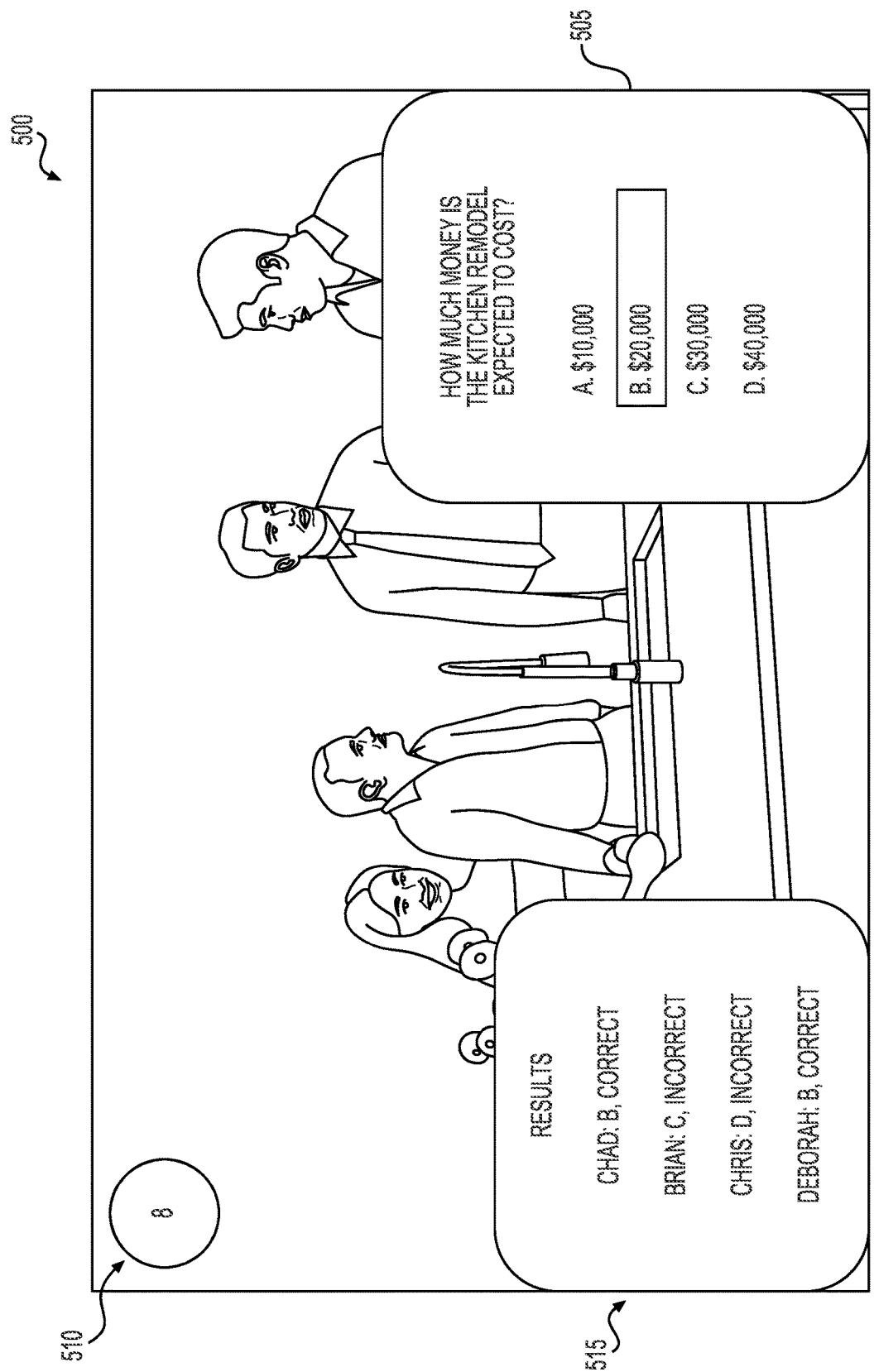
FIG. 5 depicts an exemplary interactive graphical user interface (GUI) having implemented game features associated with a quiz based game, according to one or more embodiments.

Turning now to FIG. 5, an exemplary GUI 500 depicts a non-limiting example implementation of a quiz-based game. As shown in the exemplary GUI 500, a home renovation show has been selected as the multimedia article that the participants in the virtual media streaming session have chosen to synchronously watch. In this embodiment, the show is automatically paused at the end of a scene and a quiz question 505 is presented to each participant directed a piece of information that was discussed in the previous scene (i.e., the cost of the kitchen remodel). The depicted quiz question 505 contains four answer choices (i.e., A, B, C, and D) from which a user must select one from before the countdown timer 510 reaches zero. In this situation, a user has selected answer choice B, which happens to be the correct answer. The selections of the user, as well as the other participants, may then be presented to all participants in a results window 515. Once a predetermined time period has elapsed after the results window 515 is presented (e.g., 5 seconds, 10 seconds, etc.), all windows and icons (i.e., the quiz question 505, the countdown timer 510, and the results window 515) may be removed from each participant's screen and the show may automatically resume.

In an embodiment, the participants may choose to play a poll-based game in which a plurality of polls may be periodically provided to each of the participants during the duration of the multimedia article. Each poll may contain a question associated with content occurring in the multimedia article. The question may be manually created (e.g., by a user, by a programmer of the media-streaming platform, etc.) or, alternatively, may be dynamically generated by the computer server 115 (e.g., based upon information gleaned from the multimedia article utilizing one or more video analysis techniques). In response to the poll question, the participants may select a pre-configured answer from a popup list (e.g., a "yes" or "no" answer, an answer from a multiple-choice question list, etc.) within a predetermined period of time (e.g., before the time in a presented countdown timer expires, etc.). In an embodiment, once all participants have selected an answer to the poll question or once the predetermined time limit to answer the poll question has expired, whichever of the two happens first, the results of the poll may be presented to each participant.

With continued reference to the poll-based game, in an embodiment, the participants may adjust the frequency at which the poll questions appear. For example, the participants may desire for poll questions to occur at predetermined intervals (e.g., every 5 minutes, etc.) or, alternatively, may desire for the poll questions to occur after each scene. In an embodiment, the multimedia article may be automatically paused during provision of the poll-question or, alternatively, may be configured to continue playing while participants answer the poll question. Non-limiting examples of poll questions may include: "Do you think he committed the crime?" after a scene in a crime investigation show; "What do you think is the right path for him to take?" after a scene in an adventure film; and "How do you think the date went?" after a date in a reality dating show.

Figure 6:
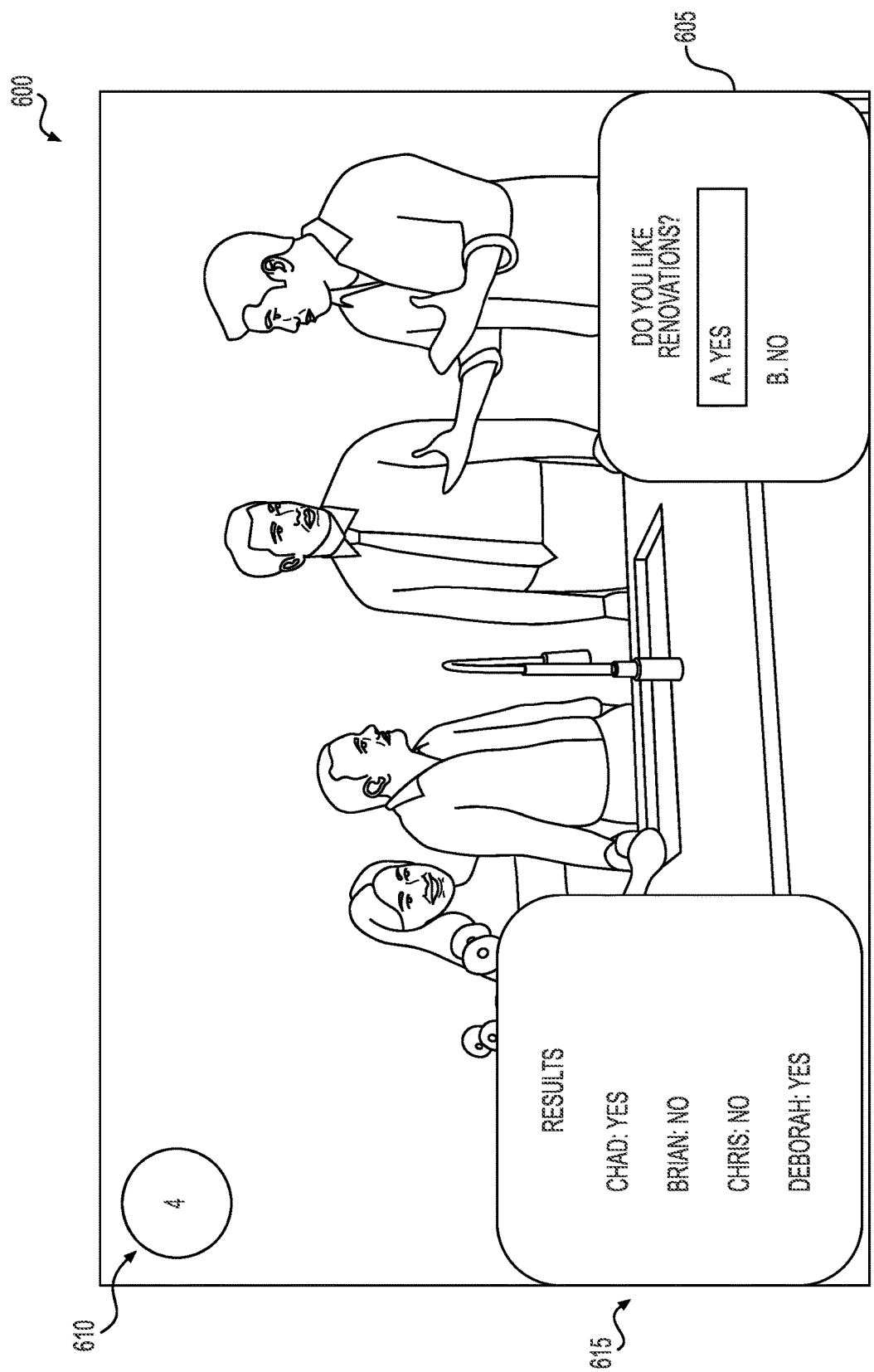
FIG. 6 depicts an exemplary interactive graphical user interface (GUI) having implemented game features associated with a poll-based game, according to one or more embodiments.

Turning now to FIG. 6, an exemplary GUI 600 depicts a non-limiting example implementation of a poll-based game. As shown in the exemplary GUI 600, a home renovation show has been selected as the multimedia article that the participants in the virtual media streaming session have chosen to synchronously watch. In this embodiment, the show is automatically paused at the end of a scene and a poll question 605 is presented that requests each participant to indicate whether or not they liked the kitchen renovations that occurred in the home renovation show. The depicted poll question 605 contains two answer choices (i.e., yes and no) from which a user must choose one before the countdown timer 610 reaches zero. In this situation, a user has selected "yes", indicating that they do like the home renovations. The selections of the user, as well as the other participants, may then be presented to all participants in a results window 615. Once a predetermined time period has elapsed after the results window 615 is presented (e.g., 5 seconds, 10 seconds, etc.), all windows and icons (i.e., the poll question 605, the countdown timer 610, and the results window 615) may be removed from each participant's screen and the show may automatically resume.

In an embodiment, the participants may choose to play a sing-a-long game in which they may be asked to sing along with a song occurring in the multimedia article. The sing-a-long game may be optimized for those articles of multimedia content that have one or more musical portions contained within (e.g., a musical show or film, a concert recording, a music video, etc.). In an embodiment, the computer server 115 may identify the song-based portions of the multimedia article using one or more previously described audio and/or video analysis techniques. In an embodiment, a notification may be provided to the participants when the song-based portion occurs in the multimedia article. In an embodiment, the notification may request that each participant sing or, alternatively, that only a singular designated participant should sing. In an embodiment, the notification may further specify how the designated participants should sing the song (e.g., using their normal voice, using a higher pitched voice, using a lower pitched voice, matching the pitch and/or tone of the original character(s) singing the song, etc.).

With continued reference to the sing-a-long game, in an embodiment, the designated participants may record their singing audio (e.g., using one or more microphones integrally or operatively coupled to their device). Upon receiving the audio recording(s), the computer server 115 may present the recorded audio to the other participants in the virtual media streaming session in one or more different ways. For example, the computer server 115 may present the recorded audio substantially as it is being recorded (e.g., the participant audio may be presented concurrently with the normal music, the normal music may be dynamically muted and replaced with the participant audio, etc.). As another example, the computer server 115 may dynamically pause the article of multimedia content (e.g., after the song is complete), play the recorded participant audio, and then automatically resume the article of multimedia content. In yet another example, an embodiment may present indications of each participant's recorded audio clip to the watch party (e.g., on a corner of the screen). Upon participant selection of a recorded audio clip, the selected audio clip may be played back to the selecting participant.

Figure 7:
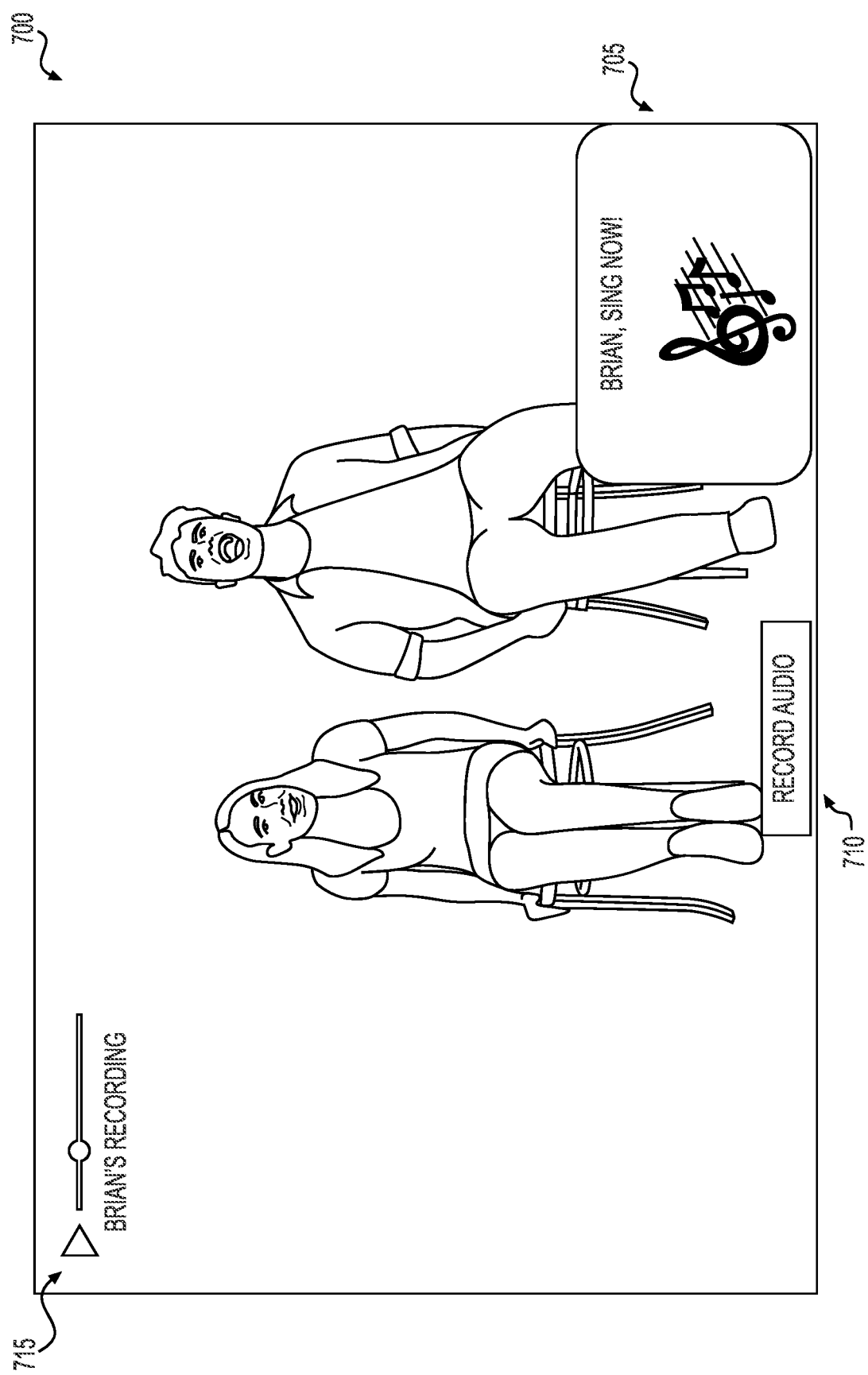
FIG. 7 depicts an exemplary interactive graphical user interface (GUI) having implemented game features associated with a sing-a-long game, according to one or more embodiments.
Figure 8:
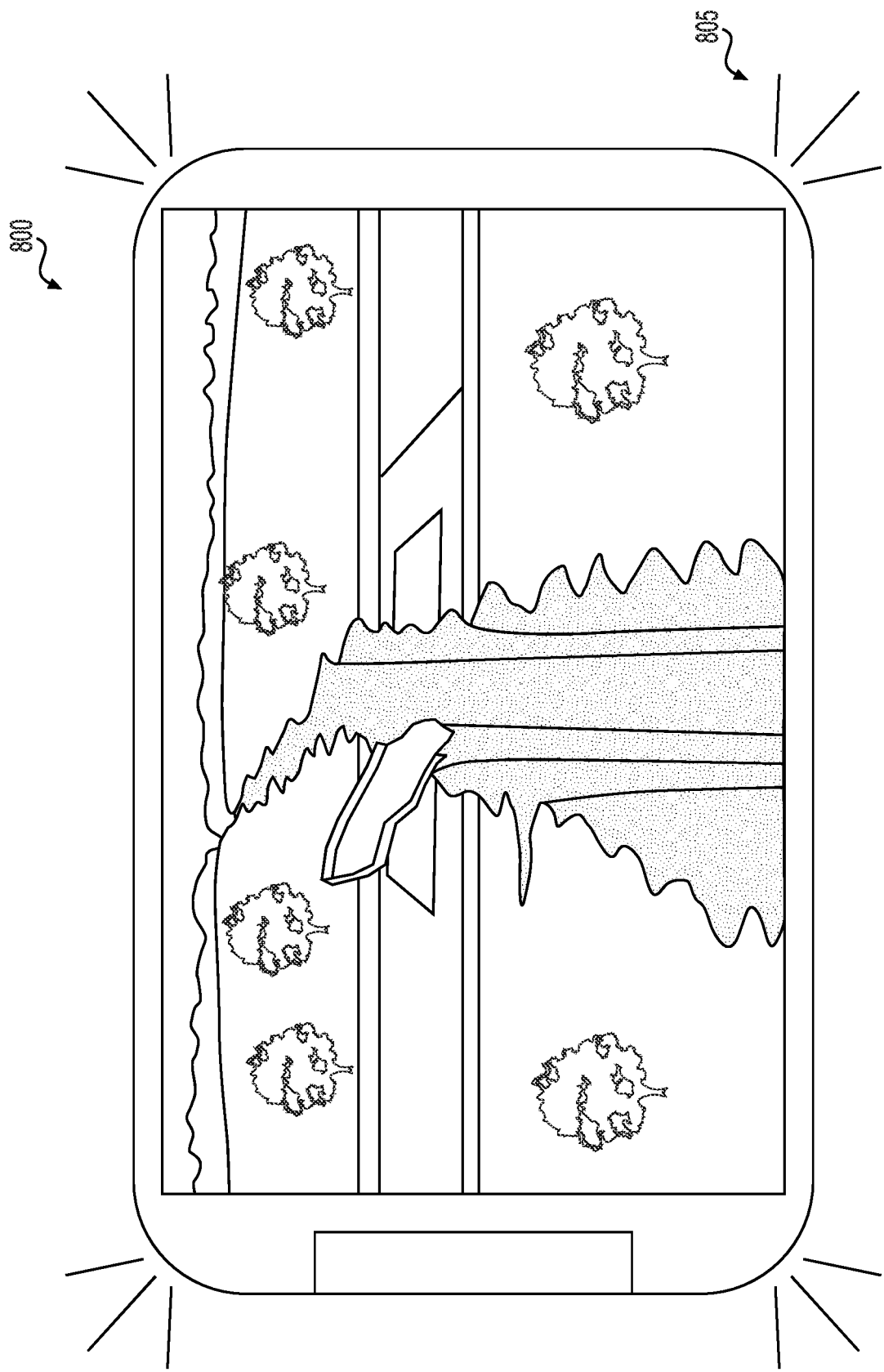
FIG. 8 depicts an exemplary implementation of a haptic effect on a participant device, according to one or more embodiments.

Turning now to FIG. 7, an exemplary GUI 700 depicts a non-limiting example implementation of a sing-a-long game. As shown in the exemplary GUI 700, a musical has been selected as the multimedia article that the participants in the virtual media streaming session have chosen to synchronously watch. In this embodiment, upon detection of a singing portion, a notification 705 is presented to a single participant, i.e. "Brian", instructing them to sing. Upon receipt of this notification 705, Brian may select the "record audio" icon 710 to record their singing input. Once Brian's recording is complete, it may be accessible to the other participants in the virtual media streaming session. In this embodiment, Brian's recording may be manifest as a play bar 715 that is presented in the corner of each participant's screen. Upon clicking the "play" icon on the play bar 715, the recording of Brian singing may be played back to the selecting participant.

In an embodiment, any combination of the foregoing game types may be implemented simultaneously (i.e., during viewing of a single article of multimedia content). For example, a singular participant may be designated to sing a song and then the remainder of the participants may be polled about that participant's performance. As another example, during viewing of a multimedia article, the participants may be presented with both quiz questions and item-spotting challenges related to the content occurring in the multimedia article.

In an embodiment, the shared viewing experience of the participants in the watch party may be further augmented by leveraging one or more sensors on the participant devices. For instance, the computer server 115 may provide instructions to the connected devices to provide haptic feedback (e.g., by leveraging one or more actuators integrated within these devices, etc.) that is synced with certain events occurring in the multimedia article. As a non-limiting example, and with reference to the exemplary GUI 800 in FIG. 8, an earthquake may be occurring in a natural disaster film 805. To simulate the rumbling sensation of the earthquake, each connected participant device may be configured to vibrate 810 (e.g., via actuating one or more integrated actuators, etc.) during some or all scenes involving the earthquake.

In an embodiment, the watch party may include additional features that may improve the shared viewing experience.

For example, the virtual media streaming session may contain a continuous play feature (not illustrated) that, when activated, may play another multimedia article after the conclusion of the current multimedia article. As another example, a democratic voting feature may be enabled that may allow participants to vote on the next article of multimedia content to watch, with a majority vote dictating the next article of multimedia content that may be presented in the virtual media streaming session.

Figure 9:
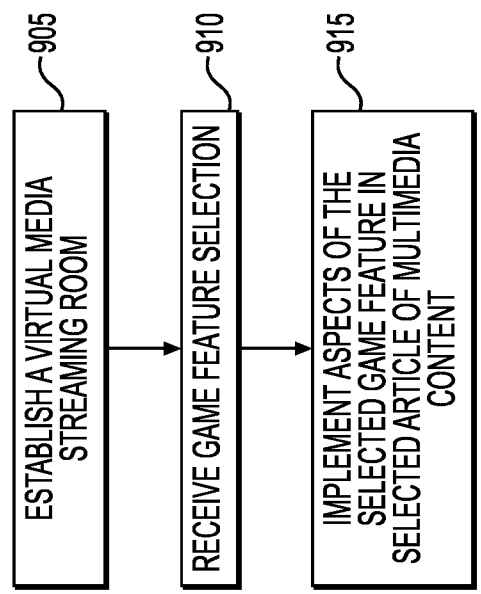
FIG. 9 depicts an exemplary flowchart of a method of transmitting interactive game features to devices associated with a synchronous multimedia stream, according to one or more embodiments.

FIG. 9 is a flowchart illustrating an exemplary method 900 for transmitting one or more game features to devices associated with the synchronous multimedia stream, according to one or more embodiments of the present disclosure. The method 900 may be performed by computer server 115 (shown in FIG. 1). At step 905, a virtual media streaming session may be established by the computer serer 115. The virtual media streaming session may be a digital space where the user profiles of one or more individuals may be connected together to synchronously watch a multimedia article. At step 910, the computer server 115 may detect selection of one or more game features. These game features may compliment the shared viewing experience by allowing the participants in the virtual media streaming session to engage in games that are based on the multimedia article, which may optimize the social component in the shared viewing experience. At step 915, responsive to detecting selection of one or more game features, the computer server 115 may implement rules associated with the selected games in the virtual media streaming session.

Further aspects of the disclosure are discussed in the additional embodiments below. It should be understood that embodiments in this disclosure are exemplary only, and that other embodiments may include various combinations of features from other embodiments, as well as additional or fewer features.

In general, any process discussed in this disclosure that is understood to be computer-implementable, such as the process illustrated in FIG. 9, may be performed by one or more processors of a computer server, such as computer server 115, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer server. A processor may be a central processing unit (CPU), a graphics processing unit (GPU), or any suitable types of processing unit.

A computer system, such as computer server 115, may include one or more computing devices. If the one or more processors of the computer system are implemented as a plurality of processors, the plurality of processors may be included in a single computing device or distributed among a plurality of computing devices. If a computer server 115 comprises a plurality of computing devices, the memory of the computer server 115 may include the respective memory of each computing device of the plurality of computing devices.

Figure 10:
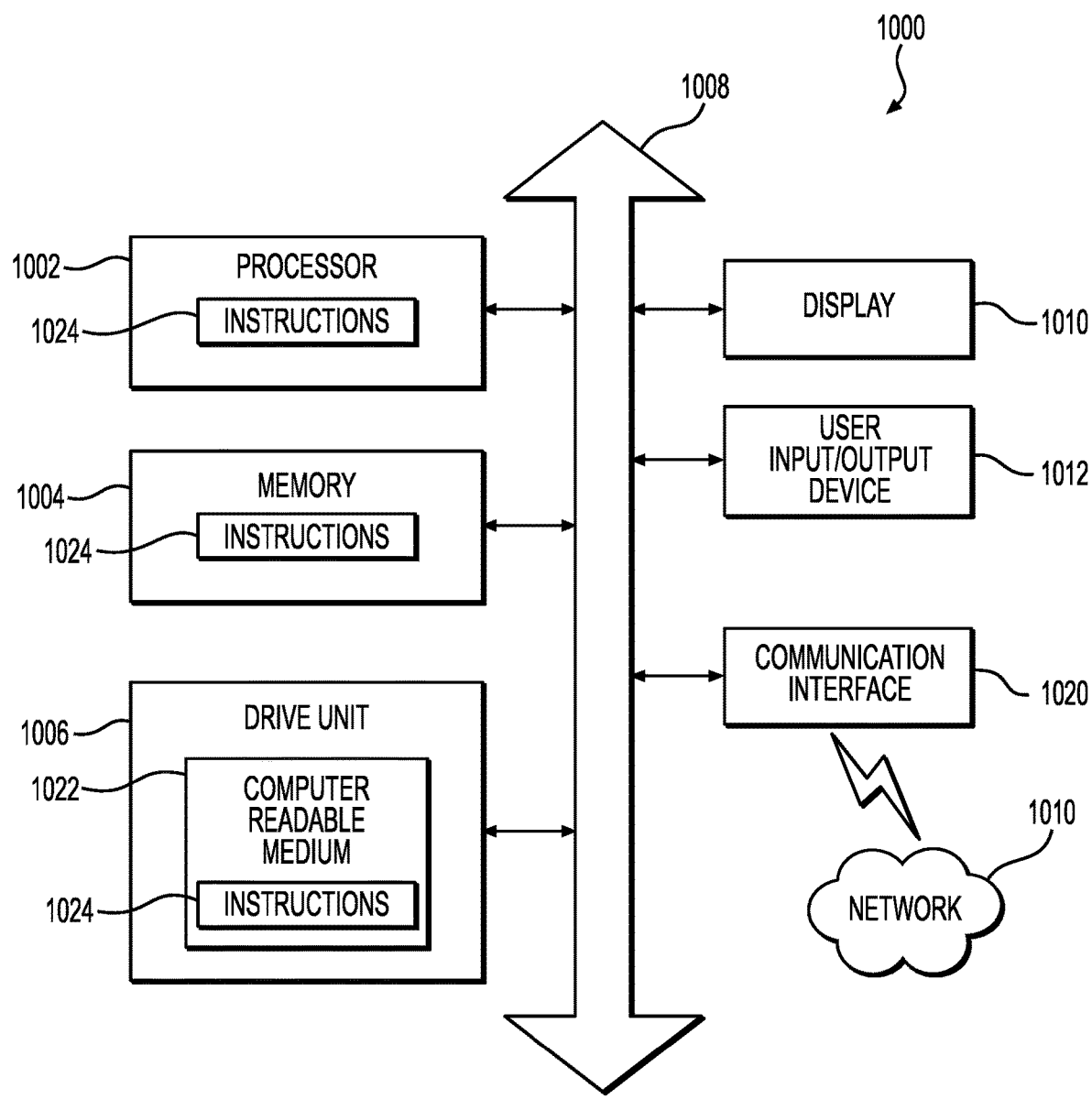
FIG. 10 depicts an exemplary computer server, according to one or more embodiments.

FIG. 10 is a simplified functional block diagram of a computer system 1000 that may be configured as a computing device for executing the process illustrated in FIG. 9, according to exemplary embodiments of the present disclosure. FIG. 10 is a simplified functional block diagram of a computer that may be configured as the computer server 115 according to exemplary embodiments of the present disclosure. In various embodiments, any of the systems herein may be an assembly of hardware including, for example, a data communication interface 1020 for packet data communication. The platform also may include a central processing unit ("CPU") 1002, in the form of one or more processors, for executing program instructions. The platform may include an internal communication bus 1008, and a storage unit 1006 (such as ROM, HDD, SDD, etc.) that may store data on a computer readable medium 1022, although the system 1000 may receive programming and data via network communications. The system 1000 may also have a memory 1004 (such as RAM) storing instructions 1024 for executing techniques presented herein, although the instructions 1024 may be stored temporarily or permanently within other modules of system 1000 (e.g., processor 1002 and/or computer readable medium 1022). The system 1000 also may include input and output ports 1012 and/or a display 1010 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to synchronous consumption of streaming media, it should be appreciated that the presently disclosed embodiments may be applicable to transmitting data and may be applicable to any environment, such as a desktop or laptop computer, a gaming console environment, and any CTV (connected TV) environment (e.g., an internet-connected device used to watch multimedia content items), etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the process shown in FIG. 13, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for transmitting interactive game features to multiple devices associated with a synchronous multimedia stream using a server in network communication with at least one database, the method comprising operations including:
    establishing, on the server, a virtual media streaming session;
    connecting, using a processor associated with the server, two or more user profiles of a media streaming platform to the virtual media streaming session;
    initiating streaming, using the processor and in the virtual media streaming session, of an article of multimedia content, wherein the article of multimedia content is simultaneously viewable on user devices associated with each of the two or more user profiles and wherein the article of multimedia content is prerecorded;
    implementing, using the processor, aspects associated with one or more interactive game features in the virtual media streaming session; and
    transmitting, using the processor and responsive to the implementing, a request for user input from at least one of the two or more user profiles in furtherance of the one or more interactive game features, wherein the request is based on content occurring in the article of multimedia content.

2. The method of claim 1, wherein the implementing comprises:
    initiating, in the virtual media streaming session, a poll;
    receiving, from each of the two or more user profiles, a vote;
    determining, based on the receiving, whether a majority vote exists to activate the one or more interactive game features; and
    activating, responsive to determining that the majority vote exists, the one or more interactive game features.

3. The method of claim 1, wherein the request to provide user input corresponds to a challenge to perform a task and further comprising:
    identifying a difficulty associated with the challenge, wherein the difficulty is based on context of the content in the article of multimedia content and wherein the difficulty is one of a lower difficulty or a higher difficulty.

4. The method of claim 3, wherein:
    the context of the content for the lower difficulty corresponds to one of: an action taken by a primary character, a phrase spoken by the primary character, and a popular object characteristic;
    the context of the content for the higher difficulty corresponds to one of: an action taken by a secondary character; a phrase spoken by the secondary character, and a background object characteristic.

5. The method of claim 1, further comprising:
    identifying, in the article of multimedia content, a predetermined event; and
    transmitting, responsive to the identifying, instructions to each of the user devices to implement a haptic effect corresponding to the predetermined event.

6. A system for transmitting interactive game features to multiple devices associated with a synchronous multimedia stream, the system comprising:
a processor;
at least one database;
a server in network communication with the at least one database and the processor, the server storing instructions that are executable by the processor to:
establish a virtual media streaming session;
connect two or more user profiles of a media streaming platform to the virtual media streaming session;
initiate streaming, in the virtual media streaming session, of an article of multimedia content, wherein the article of multimedia content is simultaneously viewable on user devices associated with each of the two or more user profiles and wherein the article of multimedia content is prerecorded;
implement aspects associated with one or more interactive game features in the virtual media streaming session; and
transmit, responsive to the implementing, a request for user input from to at least one of the two or more user profiles in furtherance of the one or more interactive game features, wherein the request is based on content occurring in the article of multimedia content.

7. The system of claim 6, wherein the instructions executable by the processor to implement are further configured to cause the processor to:
initiate, in the virtual media streaming session, a poll;
receive, from each of the two or more user profiles, a vote;
determine, based on the receiving, whether a majority vote exists to activate the one or more interactive game features; and
activate, responsive to determining that the majority vote exists, the one or more interactive game features.

8. The system of claim 6, wherein the request to provide user input corresponds to a challenge to perform a task and wherein the instructions are further executable to cause the processor to:
identify a difficulty associated with the challenge, wherein the difficulty is based on context of the content in the article of multimedia content and wherein the difficulty is one of a lower difficulty or a higher difficulty.

9. The system of claim 8, wherein:
the context of the content for the lower difficulty corresponds to one of: an action taken by a primary character, a phrase spoken by the primary character, and a popular object characteristic;
the context of the content for the higher difficulty corresponds to one of: an action taken by a secondary character; a phrase spoken by the secondary character, and a background object characteristic.

10. The system of claim 6, wherein the instructions are further executable to cause the processor to:
identify, in the article of multimedia content, a predetermined event; and
transmit, responsive to the identifying, instructions to each of the user devices to implement a haptic effect corresponding to the predetermined event.

11. A non-transitory computer-readable medium storing computer-executable instructions which, when executed by a server in network communication with at least one database, cause the server to perform operations comprising:
establishing a virtual media streaming session;
connecting two or more user profiles of a media streaming platform to the virtual media streaming session;
initiating streaming, in the virtual media streaming session, of an article of multimedia content, wherein the article of multimedia content is simultaneously viewable on user devices associated with each of the two or more user profiles and wherein the article of multimedia content is prerecorded;
implementing, using the processor, aspects associated with one or more interactive game features in the virtual media streaming session; and
transmitting, responsive to the implementing, a request for user input from to at least one of the two or more user profiles in furtherance of the one or more interactive game features to perform a task, wherein the request is based on content occurring in the article of multimedia content.

12. The non-transitory computer readable medium of claim 11, wherein the implementing determining comprises:
initiating, in the virtual media streaming session, a poll;
receiving, from each of the two or more user profiles, a vote;
determining, based on the receiving, whether a majority vote exists to activate the one or more interactive game features; and
activating, responsive to determining that the majority vote exists, the one or more interactive game features.

13. The non-transitory computer readable medium of claim 11, wherein the request to provide user input corresponds to a challenge to perform a task and further comprising:
identifying a difficulty associated with the challenge, wherein the difficulty is based on context of the content in the article of multimedia content and wherein the difficulty is one of a lower difficulty or a higher difficulty;
wherein the context of the content for the lower difficulty corresponds to one of: an action taken by a primary character, a phrase spoken by the primary character, and a popular object characteristic;
wherein the context of the content for the higher difficulty corresponds to one of:
an action taken by a secondary character; a phrase spoken by the secondary character, and a background object characteristic.

14. The non-transitory computer-readable medium of claim 11, further comprising:
identifying, in the article of multimedia content, a predetermined event; and
transmitting, responsive to the identifying, instructions to each of the user devices to implement a haptic effect corresponding to the predetermined event.

15. The system of claim 6, wherein the implementing comprises:
identifying, in the article of multimedia content, occurrence of one or more events;
causing, subsequent to the identifying, the article of multimedia content to be paused;
presenting, to users associated with the two or more user profiles, the request for user input, wherein the request for user input corresponds to a question directed to the one or more events;
receiving, in response to the question, user input directed to at least two selectable answer options associated with the question;
presenting a summary of the received user input from the users in the virtual media streaming session; and causing, subsequent to presenting the received user input for a predetermined period of time, the article of multimedia content to become unpaused.

16. The method of claim 15, wherein the presenting comprises concurrently displaying a timer indicating a remaining time in which the user input to the question will be accepted.

17. The method of claim 1, wherein the implementing comprises implementing aspects of a first game type to a first subset of the two or more user profiles and implement aspects of a second game type to a second subset of the two or more user profiles.

18. The system of claim 6, wherein the instructions executable by the processor to implement are further configured to cause the processor to:
  identify, in the article of multimedia content, occurrence of one or more events;
  cause, subsequent to the identifying, the article of multimedia content to be paused;
  present, to users associated with the two or more user profiles, the request for user input, wherein the request for user input corresponds to a question directed to the one or more events;
  receive, in response to the question, user input directed to at least two selectable answer options associated with the question;
  present a summary of the received user input from the users in the virtual media streaming session; and
  cause, subsequent to presenting the received user input for a predetermined period of time, the article of multimedia content to become unpaused.

19. The system of claim 18, wherein the instructions executable by the processor to present are further configured to cause the processor to:
  concurrently display a timer indicating a remaining time in which the user input to the question will be accepted.

20. The system of claim 18, wherein the instructions executable by the processor to implement are further configured to cause the processor to:
  implement aspects of a first game type to a first subset of the two or more user profiles and implement aspects of a second game type to a second subset of the two or more user profiles.

* * * * *

UNITED STATES PATENT AND TRADEMARK OFFICE
CERTIFICATE OF CORRECTION

| | | |
|---|---|---|
| PATENT NO. | : 12,109,498 B2 | Page 1 of 1 |
| APPLICATION NO. | : 18/186666 | |
| DATED | : October 8, 2024 | |
| INVENTOR(S) | : Brian F. Roberts, Chad Peltola and Charles Robertson | |

It is certified that error appears in the above-identified patent and that said Letters Patent is hereby corrected as shown below:

In the Claims

Column 19, Line 23, Claim 6, after "from" delete "to"

Column 20, Line 12, Claim 11, after "from" delete "to"

Column 20, Line 18, Claim 12, after "implementing" delete "determining"

Signed and Sealed this
Twelfth Day of November, 2024

*Katherine Kelly Vidal*

Katherine Kelly Vidal
*Director of the United States Patent and Trademark Office*